US007715613B2

(12) United States Patent
Dobbs et al.

(10) Patent No.: US 7,715,613 B2
(45) Date of Patent: May 11, 2010

(54) UV COUNTERFEIT CURRENCY DETECTOR

(75) Inventors: Mark Dobbs, DRI Mark Products, Inc., 15 Harbor Park Dr., Port Washington, NY (US) 11050; Jeffrey Kelsoe, San Diego, CA (US); Dwight Haas, Port Washington, NY (US)

(73) Assignee: Mark Dobbs, Port Washington, NY (US)

( * ) Notice: Subject to any disclaimer, the term of this patent is extended or adjusted under 35 U.S.C. 154(b) by 915 days.

(21) Appl. No.: 11/517,746

(22) Filed: Sep. 8, 2006

(65) Prior Publication Data

US 2008/0063252 A1 Mar. 13, 2008

(51) Int. Cl.
*G06K 9/00* (2006.01)
*G06K 5/00* (2006.01)

(52) U.S. Cl. ........................................ 382/135; 356/71

(58) Field of Classification Search ................. 382/135, 382/137, 140; 356/71; 194/302
See application file for complete search history.

(56) References Cited

U.S. PATENT DOCUMENTS 3,774,046 A * 11/1973 Hoch et al. .............. 250/485.1
5,444,263 A * 8/1995 Mastnak ................. 250/504 H
5,874,742 A * 2/1999 Romano .................. 250/461.1
5,942,759 A * 8/1999 Romano .................. 250/461.1
6,470,093 B2 * 10/2002 Liang ......................... 382/135
2002/0163633 A1 * 11/2002 Cohen ......................... 356/71
2005/0139681 A1 * 6/2005 Premjeyanth et al. ....... 235/468
2005/0156116 A1 * 7/2005 Schuett et al. .............. 250/372

* cited by examiner

*Primary Examiner*—Jon Chang
(74) *Attorney, Agent, or Firm*—Ezra Sutton

(57) ABSTRACT

An ultraviolet (UV) detector for detecting and verifying the authenticity of documents placed therein and exposed to UV light and white light backlighting. The UV detector includes a detector housing, and a viewing chamber having a viewing mirror mounted therein for viewing documents. The detector housing also includes a document insertion slot for inserting documents into the viewing chamber adjacent to the viewing mirror. The detector housing further includes an LED holder for holding one or more LED'S to provide a source of UV light in the viewing chamber which is transmitted to the viewing mirror and to the documents for identifying UV activated features on the documents. Additionally, the detector housing includes an LED and translucent member disposed therein for providing diffuse visible white light for identifying watermarks on the documents. A user looks into the viewing chamber for viewing the UV activated features and watermarks on the documents.

17 Claims, 14 Drawing Sheets

UV COUNTERFEIT CURRENCY DETECTOR

FIELD OF THE INVENTION

The present invention relates to a desktop ultraviolet counterfeit currency detector for detecting counterfeit banknotes, paper currency, checks, passports and other counterfeit documents. More particularly, this UV counterfeit currency detector is used for verifying the authenticity of a document when it is exposed to ultraviolet (radiation) light and/or white light using LED's as the sources of light.

BACKGROUND OF THE INVENTION

Ultraviolet (UV) counterfeit currency detection devices are well-known in the prior art. The production by criminals of counterfeit currency, banknotes, bonds, stocks and the like are continually increasing throughout the world as a result of continuing improvements in printing technology, particularly in color printing equipment and the ability to obtain special currency paper by the counterfeit criminals involved. Counterfeit currency/banknotes are now being made which cannot be detected by the unaided eye, and are virtually indistinguishable from genuine banknotes and currency. Counterfeit detection devices currently exist but are generally not very reliable as they rely for their operation on the experience and judgment of the user.

There remains a need for a desk top/tabletop ultraviolet (UV) counterfeit detector that uses ambient backlight (diffused white light) from an LED to distinguish counterfeit watermarks from genuine watermarks on genuine currency, and also uses ultraviolet (UV) light/radiation from an LED to distinguish counterfeit currency paper from genuine currency paper. The UV detector should also include a translucent surface for diffusing visible white light and a viewing mirror for reflecting UV light in order to authenticate UV activated features on documents. Additionally, this detector should be portable, battery-operated, and lightweight.

DESCRIPTION OF THE PRIOR ART

Counterfeit currency detectors having various designs, configurations, structures and materials of construction have been generally disclosed in the prior art. For example, U.S. Pat. No. 5,918,960 to HOPWOOD et al. discloses a device for the detection of counterfeit objects such as counterfeit banknotes. The detecting of counterfeit banknotes is achieved by directing ultraviolet light at a sample from a light source and measuring the level of ultraviolet light reflected from the sample using a first photocell and the amount of fluorescent light generated by the sample using a second photocell. The detected levels are compared with reference levels and only if both the reflective and fluorescent criteria are satisfied is the note declared genuine. The monetary sample, during test, is swiped over a glass window, preferably under an overlying shield. This prior art patent does not disclose or teach a UV counterfeit currency detector using LED's to provide UV light and ambient backlight for detecting counterfeit documents as disclosed in the present invention.

U.S. Pat. No. 6,603,871 to LIANG discloses an authentication system for performing first order authentication of articles marked with indicia discernible in visible, ultraviolet, or infrared light or tagged with UV-sensitive or IR-sensitive chemicals. The first order authentication system provides reliable visual authentication by providing for juxtaposition of the article under test with a known reference standard sample specimen, while the article under test is illuminated by a suitable source of radiation in the visible, ultraviolet or infrared portions of the electromagnetic spectrum. Thus, the system facilitates comparison to differentiate a genuine article from a counterfeit article with first order accuracy but at a substantially lower cost than that of automated authentication systems. Additionally, the system can be used in both portable and desktop embodiments. This prior art does not disclose or teach a UV counterfeit currency detector using LED's to provide UV light and ambient backlight for detecting counterfeit documents as disclosed in the present invention.

U.S. Pat. No. 6,858,856 to BALOG et al. discloses a counterfeit detector cash register which includes a housing having an interior chamber, a keyboard on a top portion of the housing, an electrical data processor within the interior chamber, a data output device on the housing, a cash drawer, a counterfeit currency detector station within the housing, and an electrical power source. The counterfeit currency detector station includes a currency entry slot along the front of the housing, wherein paper currency is at least partially inserted into the housing. The station also includes an ultraviolet light source within the interior chamber of the housing, which emits ultraviolet light onto the paper currency while within the housing. The station further includes a viewing panel along a top portion of the housing, through which the paper currency is viewed while within the housing. This prior art does not disclose or teach a UV counterfeit currency detector using LED's to provide UV light and ambient backlight for detecting counterfeit documents as disclosed in the present invention.

U.S. Patent Application Publication No. 2006/0010071 to JONES et al. discloses a system for tracking currency bills using a currency scanning device. The scanning device includes a sensor that retrieves currency identification characteristic information of each bill processed. The currency identification characteristic information permits the unique identification of each bill processed. The system further comprises a customer identification means and means for associating each processed bill with the customer depositing the bill. Means for identifying the customer (or customer account) associated with a particular processed bill after the deposit transaction has been completed is also included in the system. This prior art publication does not disclose or teach a UV counterfeit currency detector using LED's to provide UV light and ambient backlight for detecting counterfeit documents as disclosed in the present invention.

None of the aforementioned prior art references teach or disclose a tabletop/desktop ultraviolet (UV) counterfeit currency detector that uses LED's to provide UV light and ambient backlight, and a viewing mirror for the detection of counterfeit currency, banknotes, passports, stocks, bonds, cashier checks, postal money orders, and other counterfeit documents by the differentiation of watermarks and by detecting the composition of the paper used in the document.

Accordingly, it is an object of the present invention to provide a portable, desktop ultraviolet (UV) counterfeit detector that uses LED's to provide UV light and ambient (white light) backlight, and also uses a viewing mirror for the detection of counterfeit documents by the differentiation of watermarks and by detecting the composition of the paper used in the document.

Another object of the present invention is that it provides for a compact and smaller UV counterfeit detector that uses a viewing mirror to increase the area illuminated by the 365 nm UV light source by increasing the distance the light travels from the light source to the viewing area and thereby allowing the placement of the currency only 3½ inches from the UV LED light source in order reduce the overall length of the detector.

Another object of the present invention is that it provides for a UV counterfeit detector that uses a dark interior compartment when viewing the currency in order to eliminate substantially all outside ambient light, and provides for a dual purpose viewing mirror 1) to increase the illumination area on the currency from the UV LED light source having a wavelength of 365 nm, and 2) to allow viewing by the user into the dark interior compartment without significantly increasing the entry of ambient light into the dark interior compartment.

Another object of the present invention is that it provides for a UV counterfeit detector that uses an LED as the source of visible white light to illuminate embedded watermarks on the back of the currency being examined.

Another object of the present invention is that it provides for a UV counterfeit detector device that uses a translucent plastic window that diffuses the source of visible white light in order to prevent the user from looking directly into the white light through the viewing window which provides for easier identification of hidden watermarks in the currency.

Another object of the present invention is that it provides for a counterfeit detector that has a printed circuit board (PCB) that mounts a single visible white light LED thereon.

Another object of the present invention is that it provides for a UV counterfeit detector that has a PCB having a plurality of resistors for reducing the battery voltage to the UV LED's from 4.5V to approximately 3.6V in order to use a plurality of AAA or AA batteries to power the detector.

Another object of the present invention is that it provides for a UV counterfeit detector that includes a three (3) position toggle switch or rocker switch having three (3) operating positions, wherein a first operating position is for producing a source of diffused visible white light for identification of watermarks on currency; a second operating position is for producing a source of UV light directed on the front of currency in order to illuminate UV holographic images and UV activated inks on the currency; and a third operating position is for providing an off-mode position to save battery life.

Another object of the present invention is that it provides for a UV counterfeit detector that is lightweight, portable, compact, durable, long-lasting, easy to clean and easy to operate by a user.

A further object of the present invention is that it provides for a UV counterfeit detector that can be mass-produced in an automated and economical manner and is readily affordable by the user.

SUMMARY OF THE INVENTION

In accordance with the present invention, there is provided an ultraviolet (UV) detector for detecting and verifying the authenticity of documents placed therein and exposed to ultraviolet light and ambient (white light) backlighting. The UV detector includes a detector housing, and a viewing chamber having a viewing mirror mounted therein for viewing documents. The detector housing also includes a document insertion slot for inserting documents into the viewing chamber adjacent to the viewing mirror. The detector housing further includes an LED holder for holding one or more LED's therein to provide a source of UV light in the viewing chamber which is transmitted to the viewing mirror and to the documents for identifying UV activated features on the documents, including UV holographic images and/or UV activated inks on the documents that are illuminated. The user looks into the viewing chamber for viewing the UV activated features on the viewing mirror. Additionally, the detector housing includes a translucent member disposed therein for diffusing visible white light. The UV detector includes a printed circuit board (PCB) for holding at least one LED to provide a source of visible white light in the detector housing which is transmitted to the translucent member for diffusing the visible white light for identifying watermarks on the documents that are illuminated. The user looks into the viewing chamber at the viewing mirror which reflects the identified watermarks to the user. Also, the placement of the viewing mirror increases the distance the 365 nm UV light source travels without increasing the size of the detector housing thereby increasing the illumination area on the currency.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein.

DETAILED DESCRIPTION OF THE EMBODIMENTS

Preferred Embodiment 10

Figure 1:
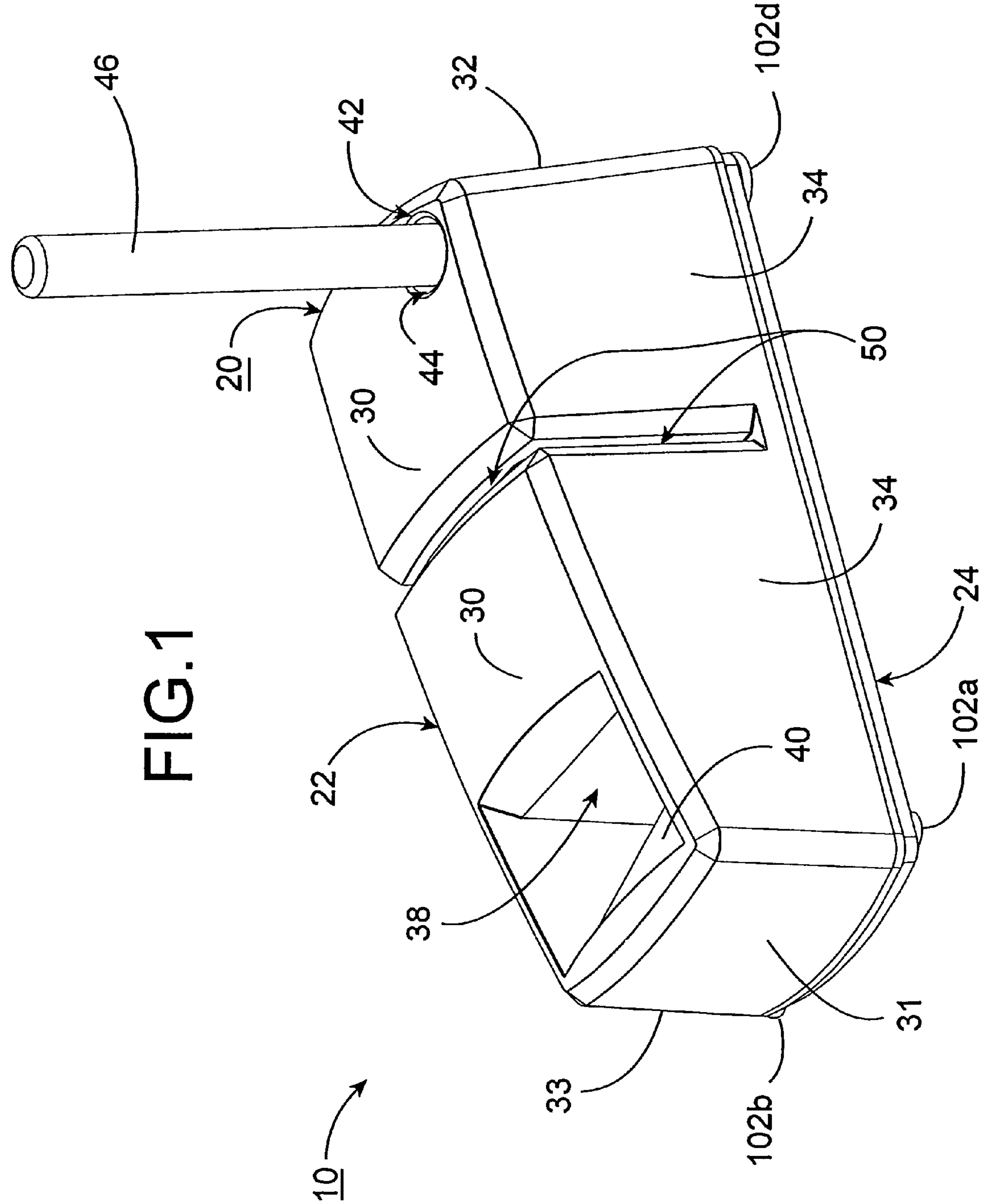
FIG. 1 is a top perspective view of the UV counterfeit currency detector of the preferred embodiment of the present invention showing a detector housing having a top covering case detachably connected to a base chassis.

The desktop ultraviolet (UV) counterfeit currency detector 10 and its component parts of the preferred embodiment of the present invention are represented in detail by FIGS. 1 through 14 of the patent drawings. The UV counterfeit currency detector 10 is used for detecting counterfeit banknotes, government paper currency, checks, passports, bonds, stocks, bank cashier checks, postal money orders, credit cards, and other counterfeit documents 12, such that the UV detector 10 is able to verify the authenticity of a document received therein when exposed to ultraviolet (UV) radiation/light and visible white light.

The UV counterfeit currency detector 10, as shown in FIGS. 1 through 5, includes a detector housing 20 having a top covering case 22 and a base chassis 24 for forming the detector housing 20. The detector housing 20 is used for holding the major component parts of the detector 10, which as shown in FIG. 7, includes a rocker switch 54 having three (3) operating positions $P_1$, $P_2$ and $P_3$, a printed circuit board (PCB) 76 having a single LED 80 mounted thereon as a source of white light, a translucent display window 88 for diffusing the white light, an LED holder 110 for holding a plurality of LED's 136 and 140 thereon which are a source of UV light, a viewing mirror 40 for reflecting the UV light, and a battery compartment 64 for receiving batteries 72 therein.

The top covering case 22 includes a top wall 30, a first end wall 31, a second end wall 32, a first side wall 33, and a second side wall 34 for forming an interior compartment 36 for receiving therein the base chassis 24. The housing 20 includes a viewing chamber 38 having a viewing mirror 40 mounted therein being adjacent to the first end wall 31. The housing 20 also includes an opening 42 having a cylindrical compartment 44 for receiving a counterfeit detection pen 46 therein with opening 42 being adjacent to the second end wall 32. The top wall 30 and side walls 33 and 34 of housing 20 also include a currency insertion viewing slot 50 for receiving therein paper currency 12, a credit card 13*c*, a financial document 13*d*, or any document to be authenticated.

Figure 12:
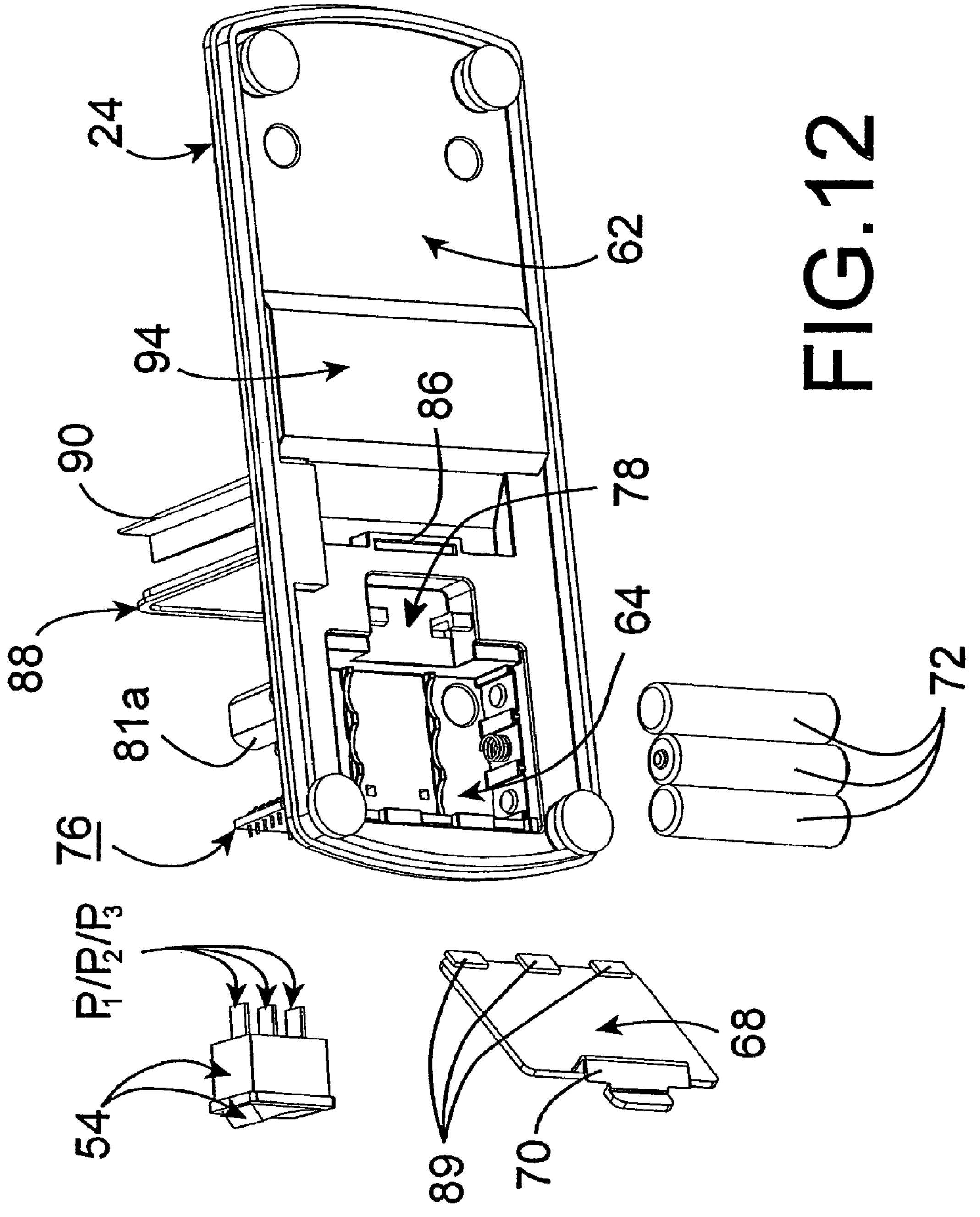
FIG. 12 is an exploded partial rear perspective view of the UV counterfeit currency detector of the present invention showing the battery compartment, the battery cover with a tab member and hinge inserts thereon, and the plurality of AAA batteries therein.
Figure 13:
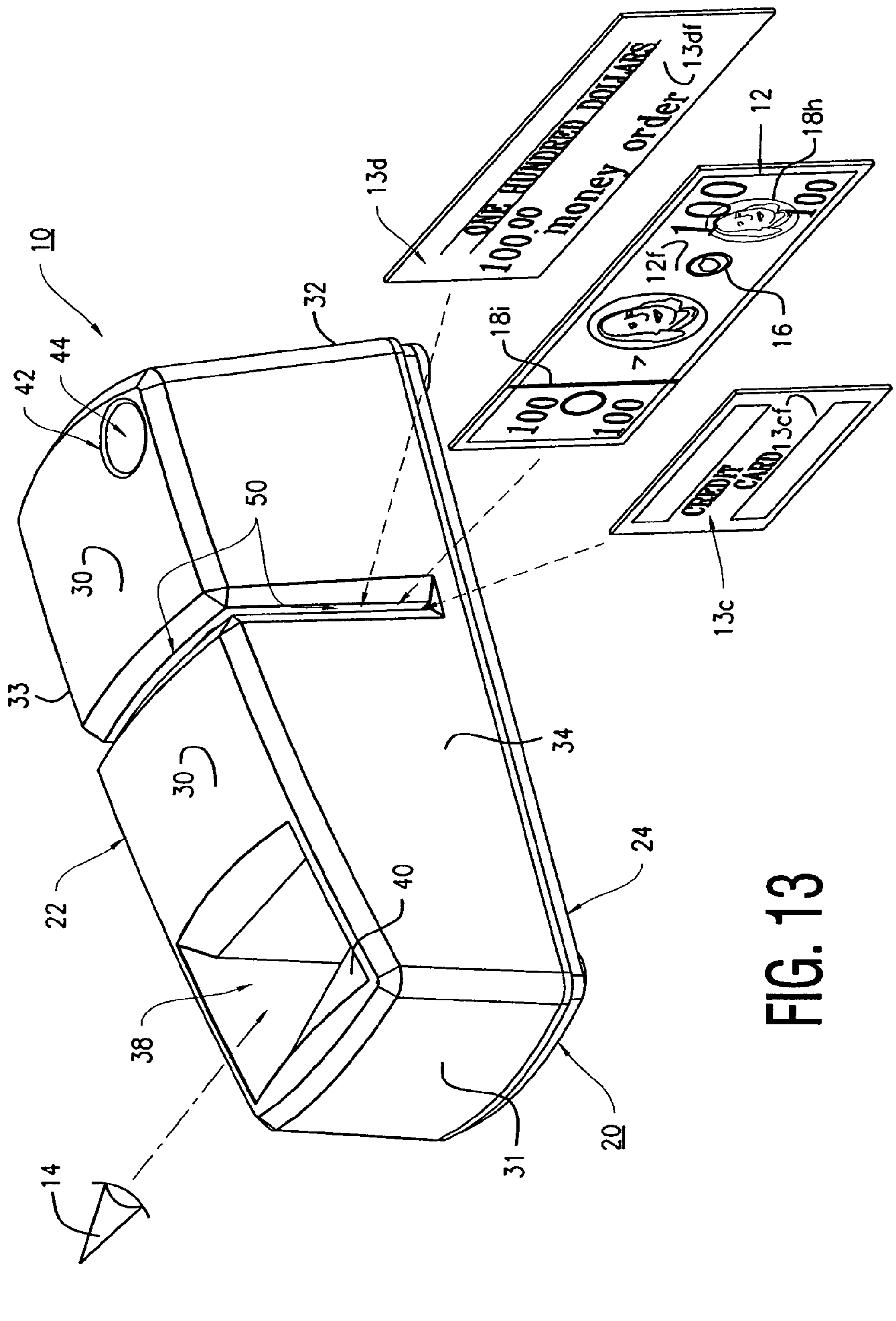
FIG. 13 is a top perspective view of the UV counterfeit currency detector of the present invention showing the detector in an operational mode for verifying a monetary bill, a credit card or a money order.

The second end wall 32 includes a switch opening 52 for receiving a rocker switch or toggle switch 54 therein. The toggle switch or rocker switch 54 includes three (3) operating positions, wherein a first operating position $P_1$ is used for producing a source of diffused visible white light $L_w$ from a single LED 80 mounted in the PCB member 76 for identification of watermarks on currency 12, as shown in FIGS. 12 and 13 of the drawings. A second operating position $P_2$ is used for producing a UV light source $L_{UV}$ from a plurality of LED's that is directed to the front 12*f* of currency bills 12 in order to illuminate UV holographic images 18*h* thereon, as well as activate UV inks 18*i* on the currency 12. A third operating position $P_3$ is used for providing an off-mode position to save the battery life of batteries 72, as shown in FIGS. 6 and 12 of the drawings.

Figure 2:
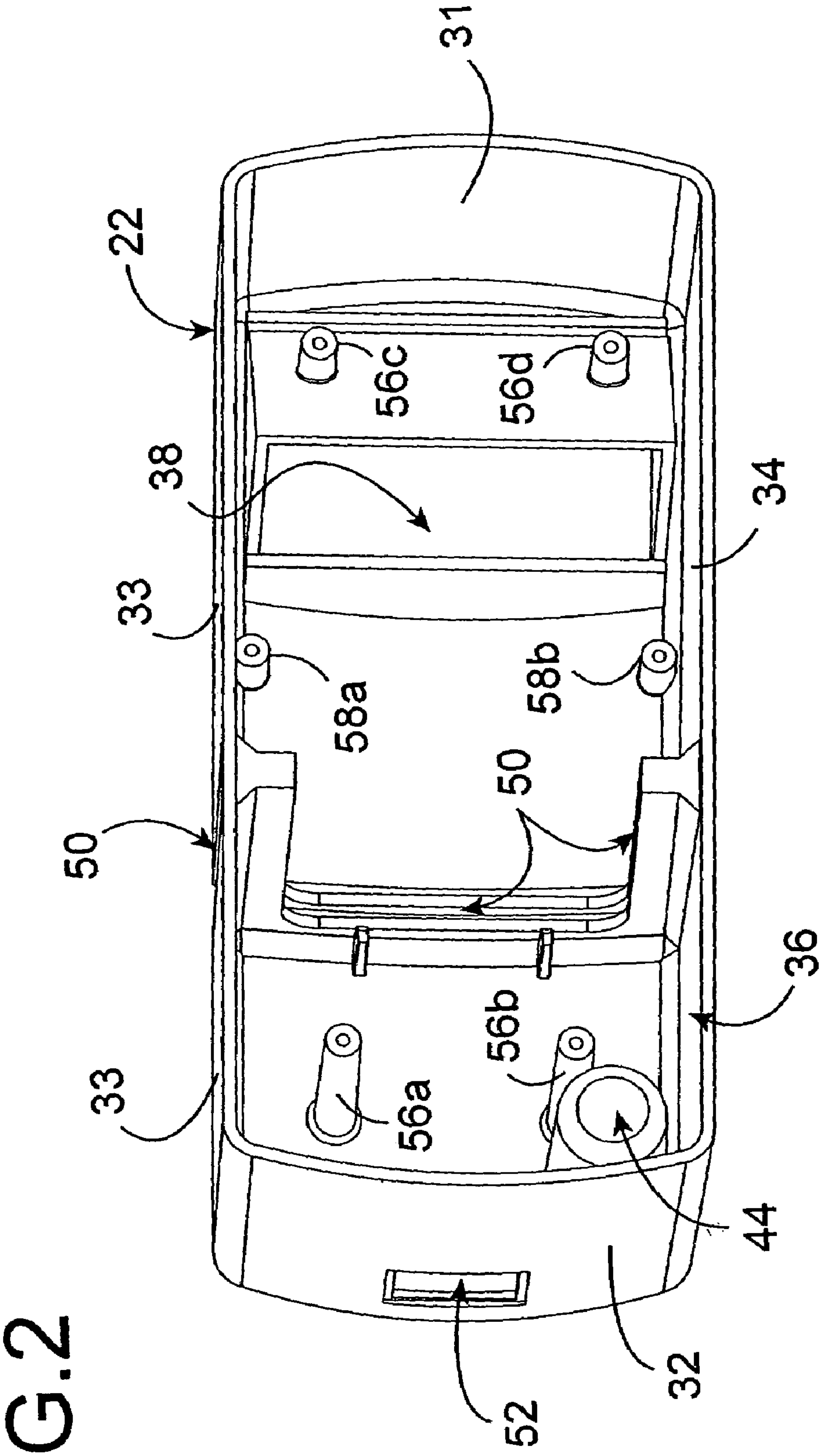
FIG. 2 is a bottom perspective view of the UV counterfeit currency detector of the present invention showing a currency insertion slot and a viewing chamber within an interior compartment.
Figure 7:
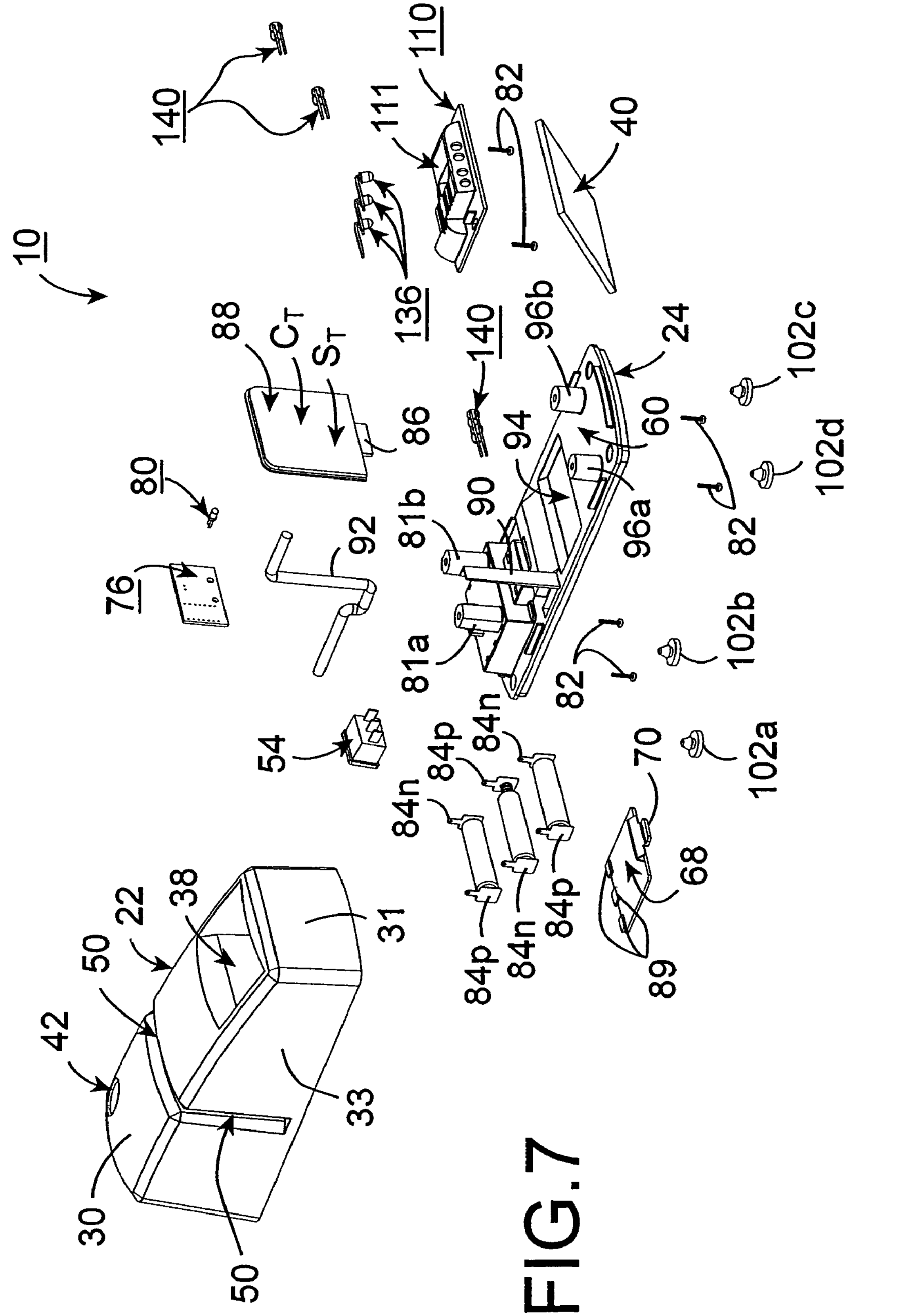
FIG. 7 is an exploded perspective view of the UV counterfeit currency detector of the present invention showing all of the major component parts of the detector.

The interior compartment 36 of the detector housing 20 includes a plurality of spaced-apart cylindrical mounting boss members 56*a*, 56*b*, 56*c* and 56*d* for holding the base chassis 24 to the covering case 22, as depicted in FIGS. 2, 7 and 13 of the drawings. The interior compartment 36 also includes a pair of mounting boss members 58*a* and 58*b* for supporting the LED holder 110 thereon.

Figure 3:
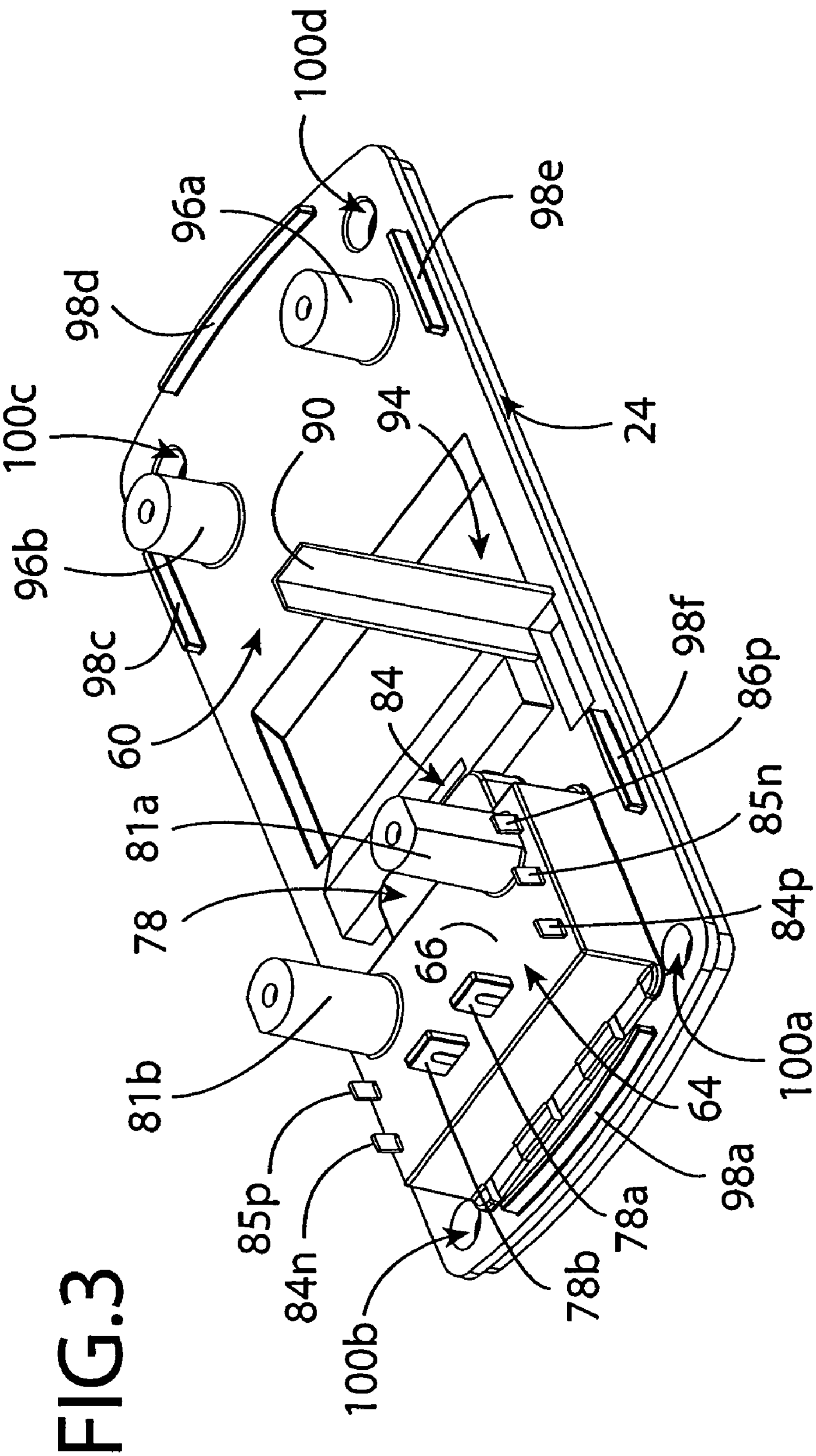
FIG. 3 is a top perspective view of the UV counterfeit currency detector of the present invention showing a plurality of mounting boss members, a mirror receiving well and an L-shaped channel bar.
Figure 4:
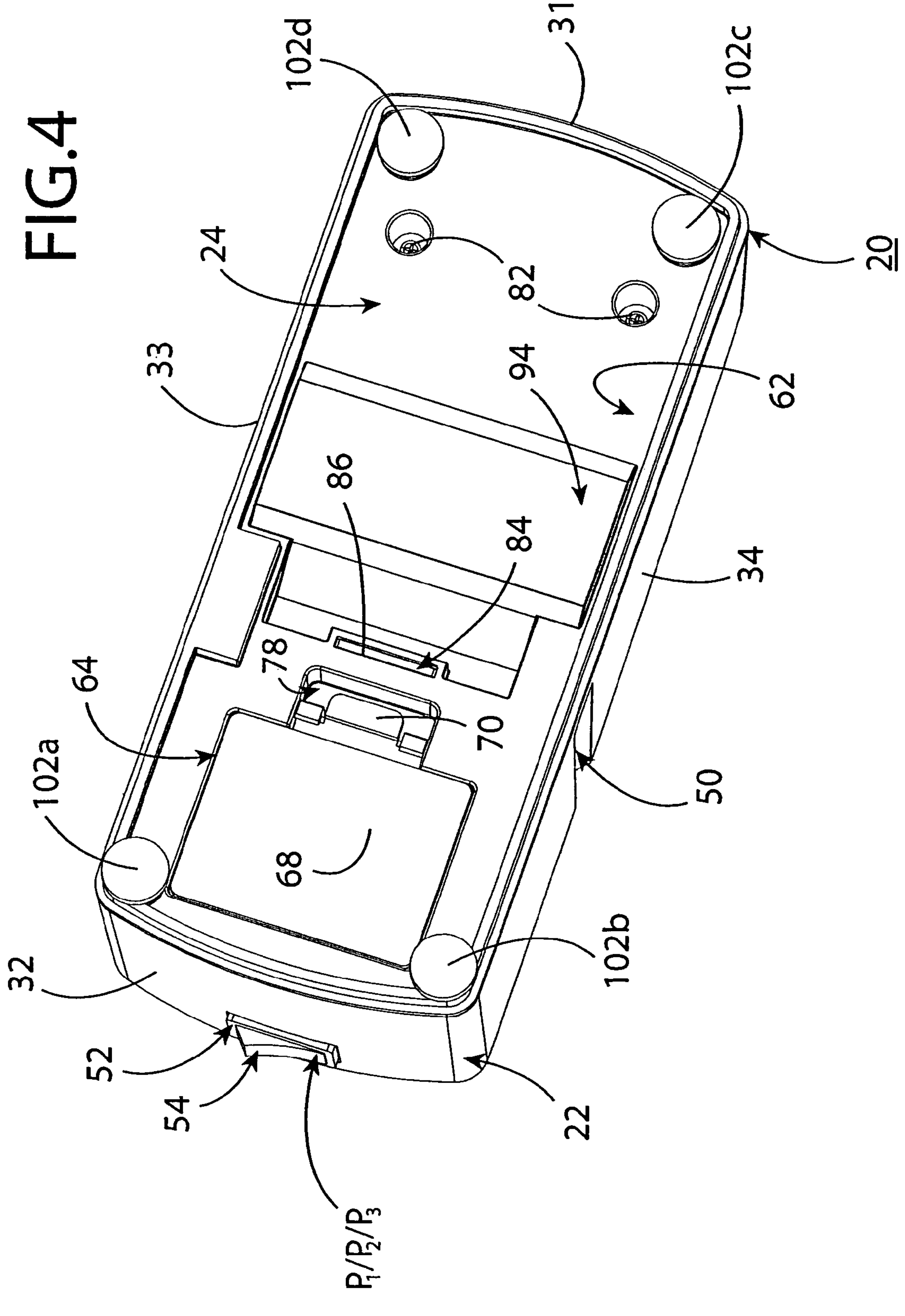
FIG. 4 is a bottom perspective view of the UV counterfeit currency detector of the present invention showing the top covering case having a rocker switch therein and the base chassis having a battery compartment with a battery cover thereon.
Figure 6:
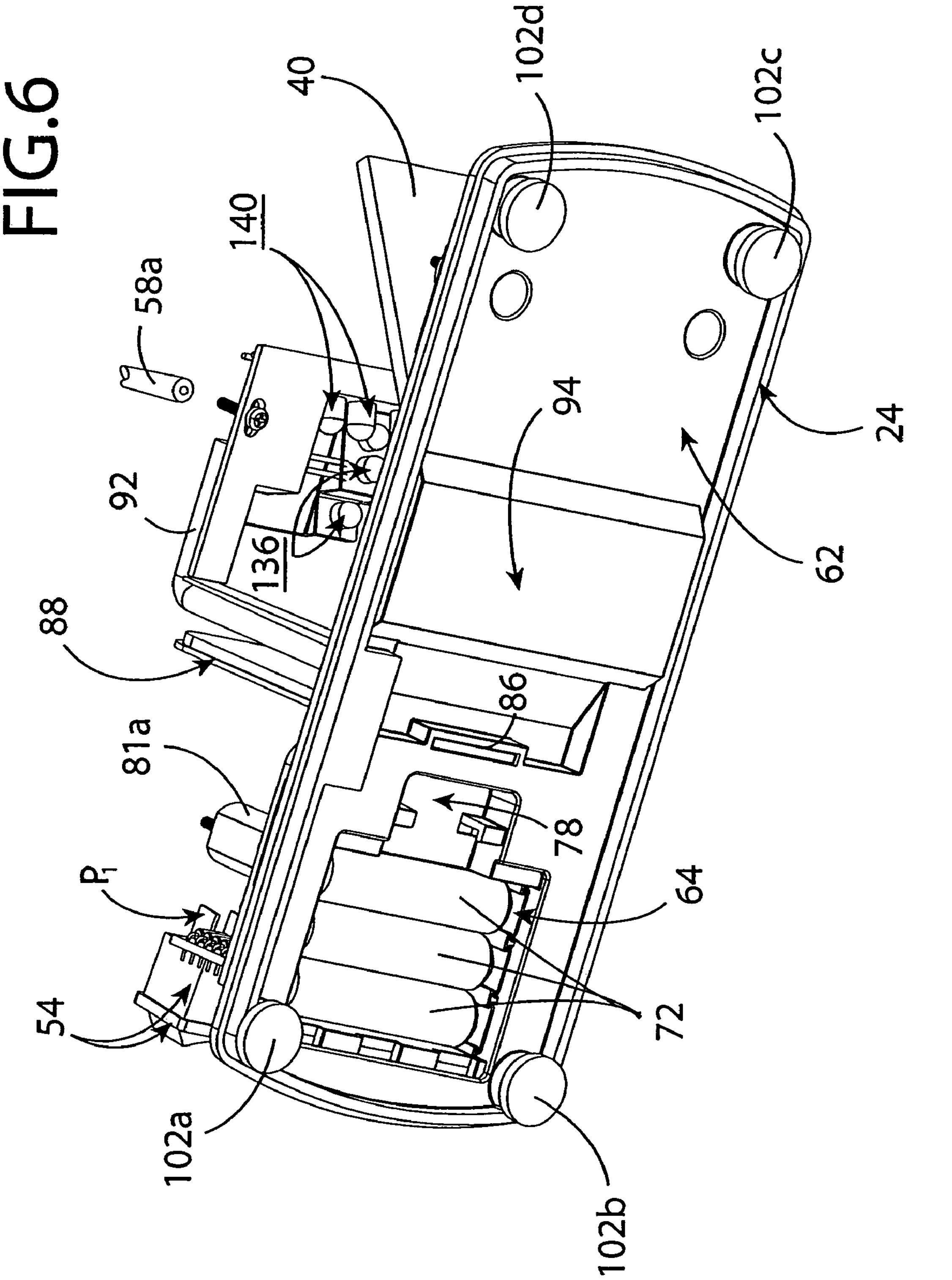
FIG. 6 is a bottom perspective view of the UV counterfeit currency detector of the present invention showing a plurality of AAA batteries within the battery compartment of the base chassis and also in an assembled mode.

The base chassis 24 of detector housing 20 includes an interior wall surface 60 and an exterior wall surface 62, as shown in FIGS. 3, 4 and 6. The exterior wall surface 62 includes a battery compartment 64 having a top wall 66 and having a detachable battery cover 68 with hinge inserts 69 and with a tab release member 70 attached thereto. Battery compartment 64 receives three (3) AAA batteries 72 therein. The battery compartment 64 also includes a chamber/compartment 78 for receiving the tab release member 70 of battery cover 68, as depicted in FIGS. 6 and 12.

Figure 5:
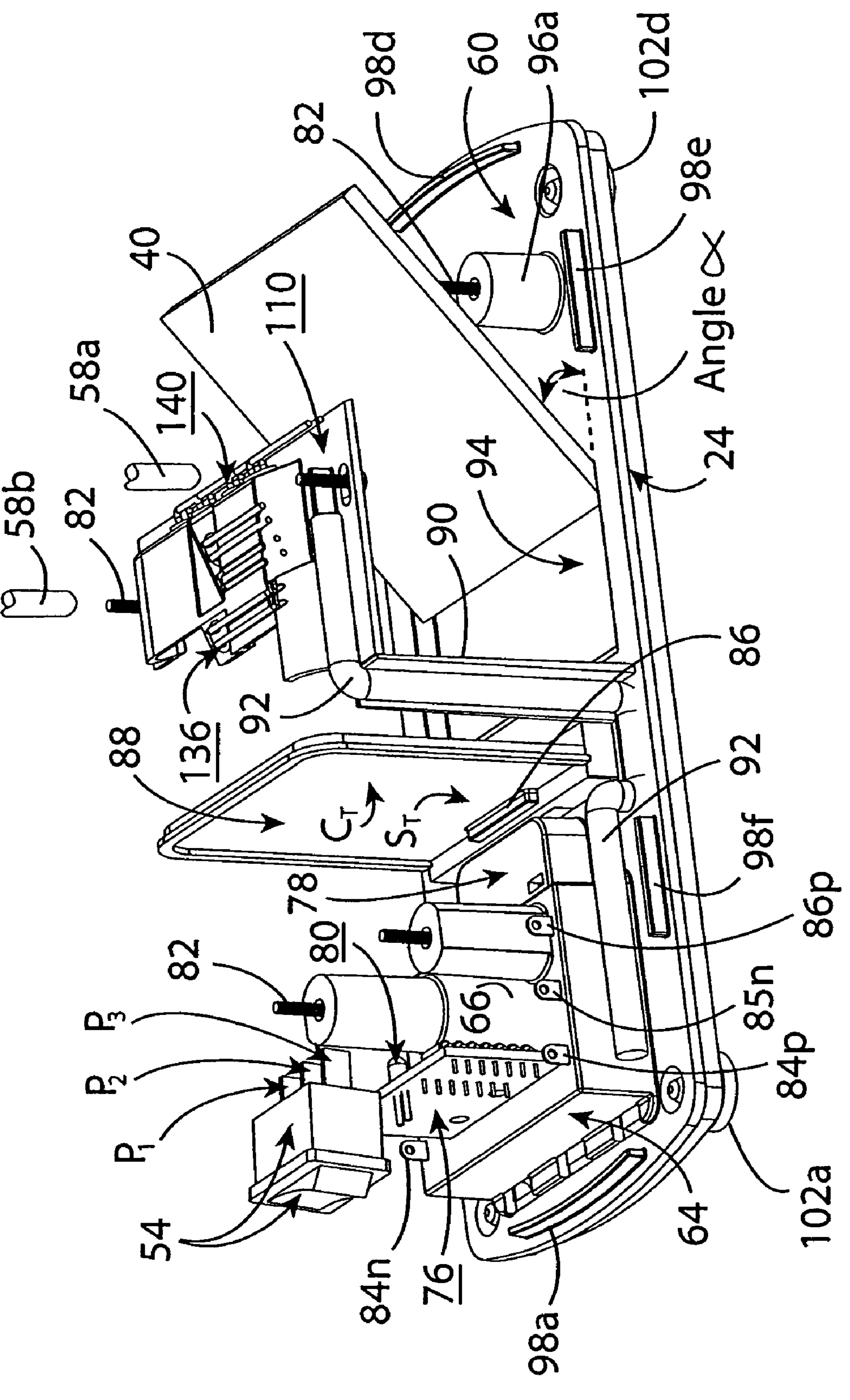
FIG. 5 is a top perspective view of the UV counterfeit currency detector of the present invention showing the major component parts in an assembled mode on the base chassis.
Figure 8:
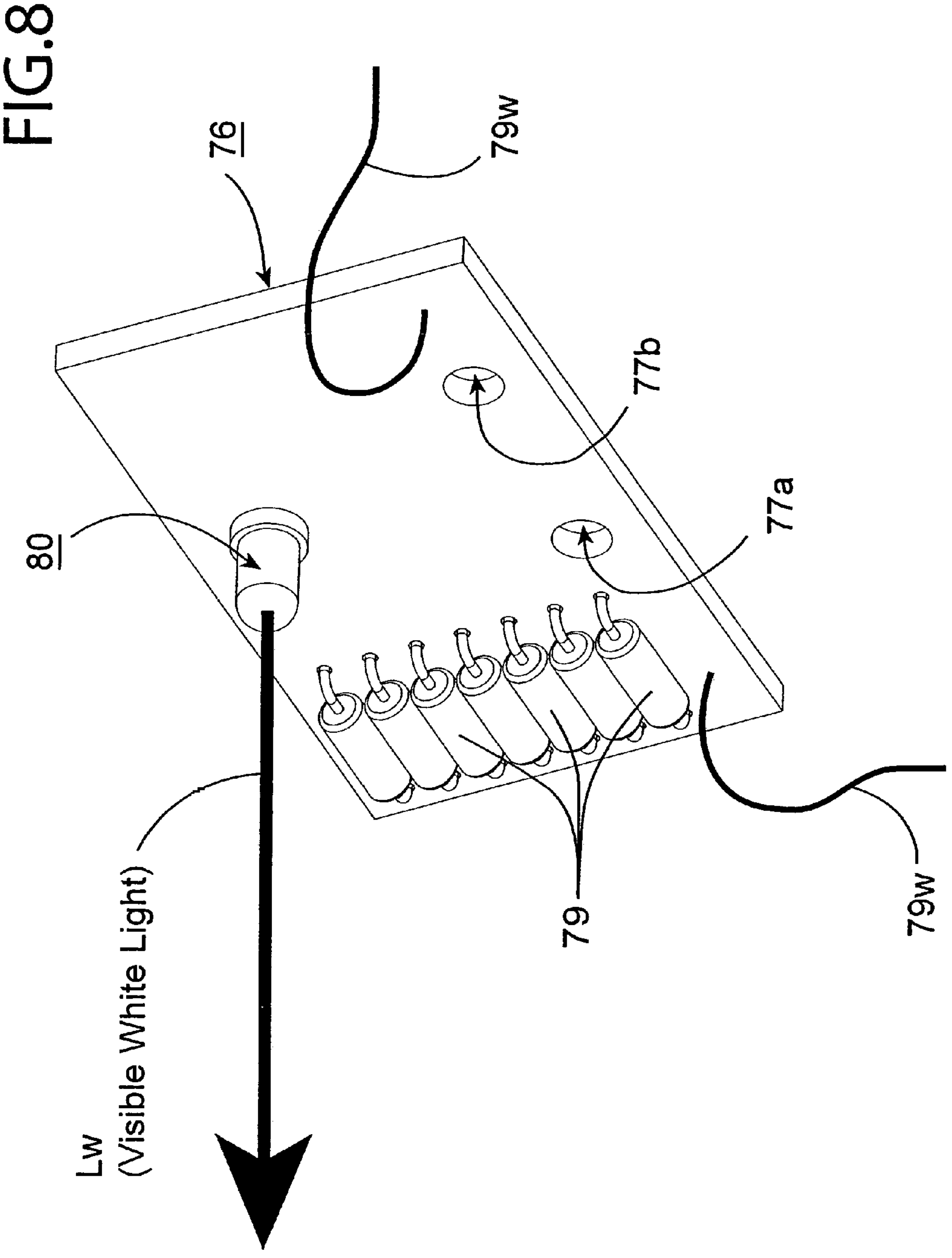
FIG. 8 is an enlarged perspective view of the UV counterfeit currency detector of the present invention showing a printed circuit board (PCB) having a plurality of resistor members, electrical wires connected to the UV LED's, and a single white light LED thereon.
Figure 9:
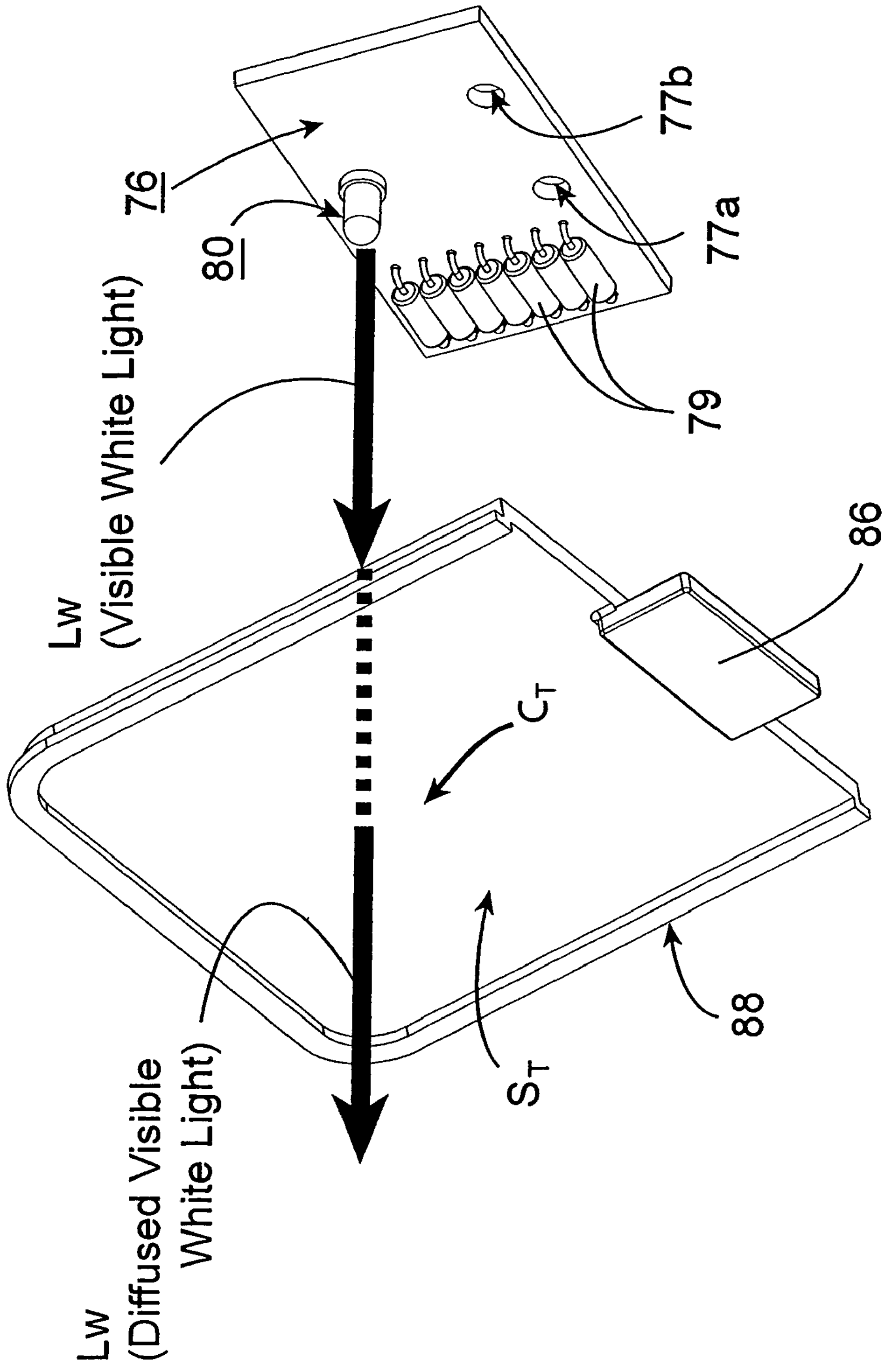
FIG. 9 is an enlarged perspective view of the UV counterfeit currency detector of the present invention showing a translucent display window.

Housing 20 includes a vertically positioned printed circuit board (PCB) 76 being supported by a pair of holding brackets 78*a* and 78*b*, as shown in FIGS. 5 and 8 of the drawings. PCB 76 includes a plurality of resistors 79 using electrical wires 79*w* for reducing the battery voltage to the UV LED members 136 and 140 from 4.5V to 3.6V in order to use the plurality of AAA batteries 72 for powering of detector 10, as shown in FIG. 8. The PCB 76 also includes board mounting openings 77*a* and 77*b* for detachably connecting PCB 76 to holding bracket members 78*a* and 78*b*, respectively, via mounting screw members 82. Additionally, PCB 76 includes a single LED 80 being centrally mounted thereon to provide a source of visible white light.

Housing 20 also includes a pair of mounting boss members 81*a* and 81*b* for connection with mounting boss members 52*a* and 52*b* for holding the covering case 22 to the base chassis 24, respectively, using mounting screw members 82 therethrough. The top wall 66 of battery compartment 64 includes a plurality of matching battery terminals (positive and negative terminals) 84*p*, 84*n*; 85*p*, 85*n*; and 86*p* and 86*n*, respectively. Each of the battery terminals are electrically connected by electrical wires 88 to the printed circuit board (PCB) 76, as shown in FIG. 8.

Housing 20 further includes a holding slot 84 for receiving therein a window tab member 86 of a plastic translucent window 88. The plastic translucent window 88 has a translucent surface $S_T$ which is used to diffuse the visible white light $L_w$ from the LED 80 mounted on the printed circuit board (PCB) member 76 (see FIG. 5). The diffused visible white light $L_w$ is used to identify the embedded watermarks 16 on currency 12 to verify its genuine authenticity. The identified watermark 16 is reflected to the viewing mirror 40 of viewing chamber 38 for viewing by the user. The interior wall surface 60 includes an L-shaped channel bar 90 for connecting LED cables 92 thereto, as depicted in FIGS. 3 and 5 of the patent drawings. The interior wall surface 60 also includes a mirror receiving well 94 for receiving the viewing mirror 40 therein, and viewing mirror 40 is positioned at an angle alpha ($\alpha$), where angle alpha ($\alpha$) is in the range of 27° to 33° with respect to the base chassis 24.

The interior wall surface 60 also includes a second pair of mounting boss members 96*a* and 96*b* for connection with mounting boss members 52*c* and 52*d* for holding covering case 22 to the base chassis 24, respectively, using mounting screw member 82 therethrough. Additionally, the interior wall surface 60 further includes a plurality of spaced-apart framing brackets 98*a*, 98*b*, 98*c*, 98*d*, 98*e* and 98*f* for positioning and placement of the covering case 22 with respect to the base chassis 24, as shown in FIGS. 3 and 5 of the drawings. The exterior wall surface 62 further includes a plurality of spaced-apart mounting hole openings 100*a*, 100*b*, 100*c* and 100*d* each for receiving rubber feet 102*a*, 102*b*, 102*c* and 102*d* therein, as shown in FIGS. 4, 6 and 7 of the drawings.

Figure 14:
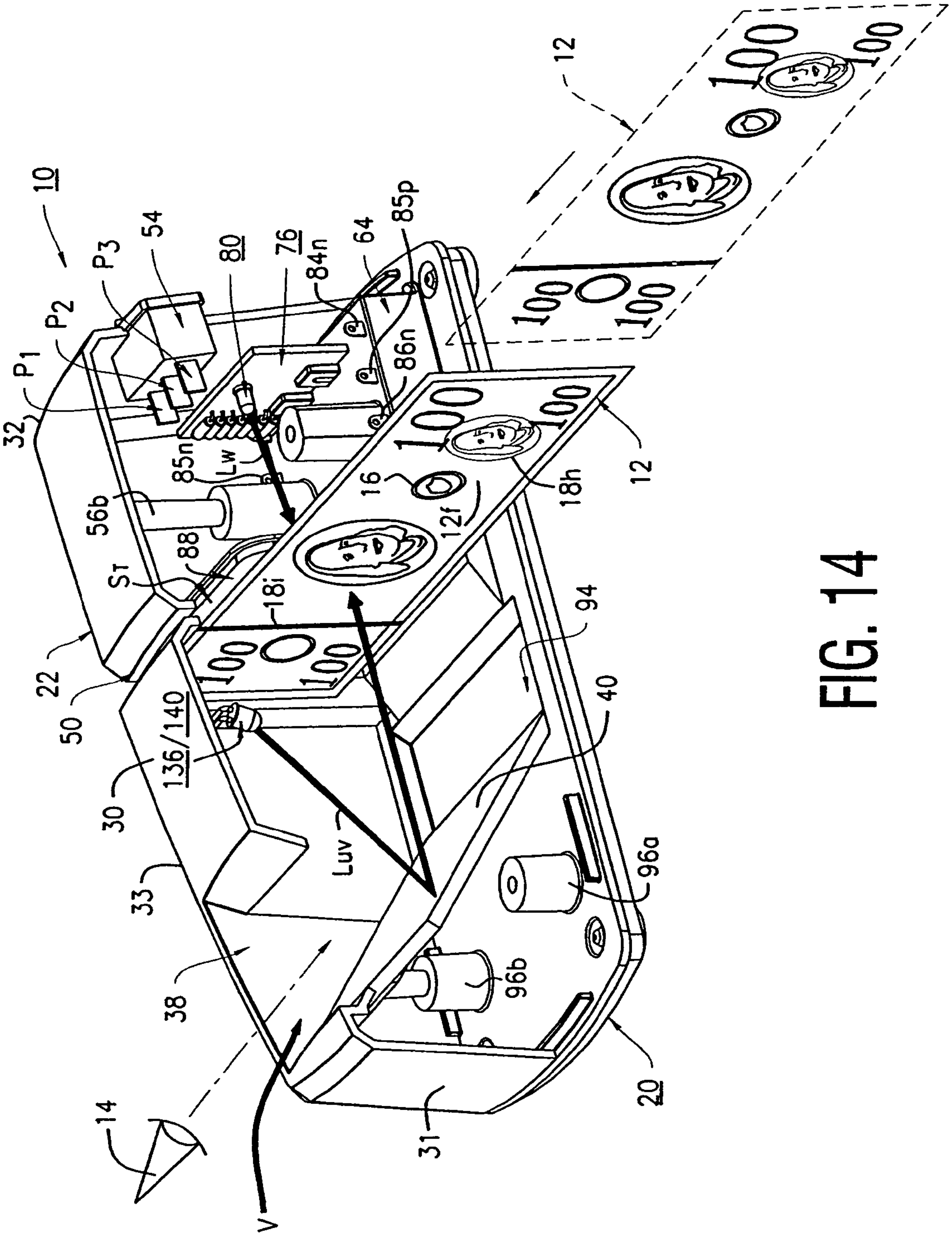
FIG. 14 is a top sectional perspective view of the UV counterfeit currency detector of the present invention showing the detector in an operational mode for verifying a monetary bill.

As shown in FIGS. 2, 6, 10 and 11, the LED holder 110 is supported by the pair of mounting boss members 58*a* and 58*b* connected to the top wall 30 of the top covering case 22 and within the interior compartment 36 (see FIG. 2). The LED holder 110 includes a housing 111 having a top wall 112, side walls 114, 116 and 118 and base perimeter walls 120, 122 and 124 for forming an interior compartment 126. The top wall 112 includes a channel 128 having a pair of angled LED mounting openings 130*a* and 130*b* therethrough, and a holder tab 132 having a single angled LED mounting opening 134 therethrough. The LED mounting openings 130*a*, 130*b*, and 134 are positioned along a first axis line 135 of the top wall 112. LED mounting openings 130*a*, 130*b* and 134 are for receiving at least three (3) LED's 136 therein, respectively. The three (3) LED's 136 are a source of UV light and each has a wavelength of 365 nm with a viewing angle of 10° to 40°. Each of the aforementioned LED's 136 are angled to direct UV light $L_{UV}$ towards the viewing mirror 40 within viewing chamber 38 which is then reflected towards a center location $C_T$ of the translucent display window 88, as depicted in FIGS. 5 and 14 of the patent drawings. By reflecting the UV light source $L_{UV}$ from the viewing mirror 40, the viewing area V within the viewing chamber 38 is illuminated by the UV LED's 136. This allows the viewing mirror 40 to increase the area illuminated by the UV LED light by four (4) times without increasing the viewing distance of viewing mirror 40, thus reducing the overall size of detector 10.

Figure 10:
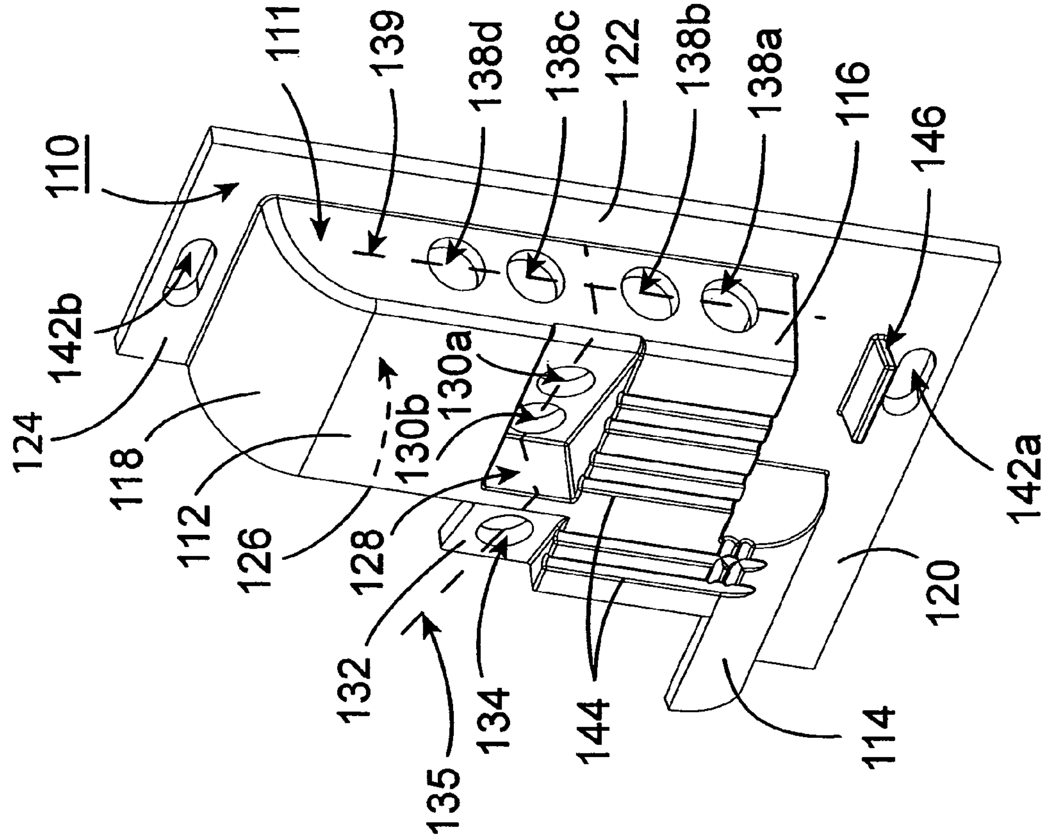
FIG. 10 is an enlarged top perspective view of the UV counterfeit currency detector of the present invention showing an LED holder member having a plurality of LED openings for receiving UV LED's therein for producing UV light.
Figure 11:
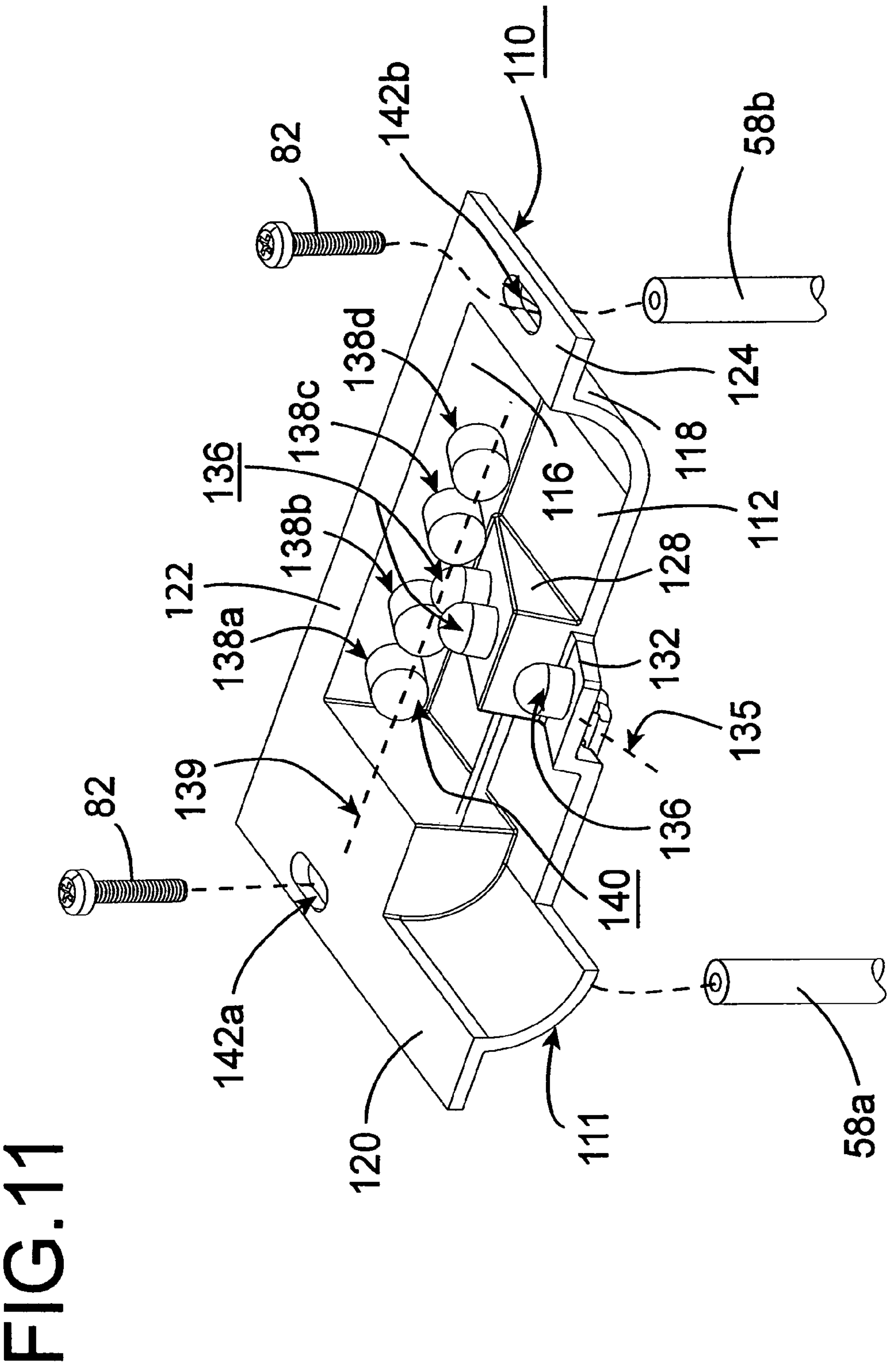
FIG. 11 is an enlarged rear perspective view of the UV counterfeit currency detector of the present invention showing the LED holder member being mounted to each of the mounting bosses.

The side wall 116 of housing 111 includes a plurality of spaced-apart, angled LED mounting openings 138*a*, 138*b*, 138*c* and 138*d* being centrally positioned along side wall 116, as shown in FIG. 11. The LED mounting openings 138*a* to 138*d* are for receiving four (4) UV LED's 140 therein, respectively, as shown in FIG. 10. The LED mounting openings 138*a* to 138*d* are positioned along a second axis line 139 of the side wall 116. The first and second axis lines 135 and 139 are perpendicular to each other, as shown in FIGS. 10 and 11 of the drawings. Each of the aforementioned LED's 140 are angled to direct the UV light sources $L_{UV}$ towards the center location $C_T$ of the translucent display window 88, as depicted in FIGS. 5 and 14, of the patent drawings. The four (4) UV LED's 140 each have a wavelength of approximately 390 nm with a viewing angle from 30 to 60 degrees. Top wall 112 also includes a plurality of spaced-apart grooves 144 for the lead wires 92 of the UV LED's 136 and 140. Base perimeter wall 120 includes a vertical holding bracket 144 for keeping the LED wires 92 out of the way of the mounting bosses 58*a* and 58*b*, accordingly.

The UV LED's 136 and 140 are used to illuminate the UV activated features in currency 12, such as a UV holographic image 18*h* and/or a UV activated ink 18*i*. The UV light from the LED's 140 is reflected back towards the center location Ct of display window 88 by viewing mirror 40 to viewing chamber 38 in order to allow the user to look into the viewing chamber 38 to verify the authenticity of currency 12, credit card 13*c*, bank check 13*d*, or other document. LED's 136 are angled directly towards the center location Ct of display window 88 to illuminate authenticity features of currency 12, credit card 13*c*, bank check 13*d*, or other document.

Operation of the Present Invention

As shown in FIGS. 5, 13 and 14 of the patent drawings, the UV counterfeit currency detector 10, operates in the following manner to verify the authenticity of inserted currency 12: The user initiates the verification process by inserting currency 12 into the insertion viewing slot 50 such that the front of the currency bill 12*f* is positioned in viewing chamber 38 where viewing mirror 40 is located, as shown in FIG. 14. As the user is looking into the viewing chamber 38, the user then activates rocker switch/toggle switch 54 to operating position $P_1$ for producing a source of diffused visible white light $L_w$ from LED 80. Thereafter, the user switches to the second operating position $P_2$ for producing a UV light source $L_{UV}$ from the UV LED members 136 and 140 held in the LED holder 110, as shown in FIGS. 5 and 11.

When the viewer 14 is using the first operating position $P_1$ (white light source $L_w$), and the viewer 14 is looking into the viewing chamber 38, the viewer moves currency 12 back and forth and looks for embedded watermarks 16 within currency 12 to verify its authenticity.

When the viewer 14 is using the second operating position $P_2$ (UV light source $L_{UV}$), and the viewer 14 is looking into the viewing chamber 38, the viewer moves currency 12 back and forth and looks for UV activated features, such as UV holographic images 18*h* or UV activated inks 18*i* being illuminated by the UV light source $L_{UV}$. The reflected UV light and direct UV light illuminates authenticity features on the currency 12 which are viewed through the viewing chamber 38 by looking at the viewing mirror 40.

After using the first and/or second operating positions $P_1$ and/or $P_2$ to verify currency 12 of its authenticity, the user 14 now switches/flips the rocker switch/toggle switch 54 to the third position $P_3$ which is an off-mode position in order to save the battery life of the three (3) AAA batteries 72 within battery compartment 64.

When using the UV detector device 10 for authentication of credit cards 13*c* or other financial documents 13*d*, the viewer/user 14 operates detector 10 in the following manner: The viewer 14 looks into the viewing chamber 38 and flips the rocker switch/toggle switch 54 to the second operating position $P_2$ which is the UV light source $L_{UV}$. The viewer 14 is able to know if the UV light source $L_{UV}$ is functioning by seeing a light blue glow of light within the viewing chamber 38. The light blue glow appears within viewing chamber 38 because the 390 nm LED's create a small amount of visible light that is light blue in color. While the viewer is still looking into viewing chamber 38, the viewer 14 slides credit card 13*c* or document 13*d* into the insertion viewing slot 50 with the front of the credit card 13*c* or document 13*d* positioned facing the viewing mirror 40, as shown in FIGS. 13 and 14 of the drawings. As the user is looking into the viewing chamber 38 (the UV light source $L_{UV}$ is operational), the user 14 slides the credit card 13*c* or document 13*d* back and forth within the insertion viewing slot 50 while looking for UV activated features, such as a UV holographic image 18*h* or a UV activated ink 18*i* which are illuminated by the UV light source $L_{UV}$. The UV light is reflected to the viewing mirror 40 which the user is viewing to verify the credit card 13*c* or financial document 13*d* of its authenticity.

After the aforementioned step is completed, the user 14 is now able to switch the rocker switch/toggle switch 54 to the third operating position $P_3$ which is the off-mode position in order to save the battery life of the three (3) AAA batteries 72 within battery compartment 64 of the detector 10.

Advantages of the Present Invention

Accordingly, it is an advantage of the present invention to provide a portable, desktop ultraviolet (UV) counterfeit detector that uses LED's to provide UV light and ambient (white light) backlight, and also uses a viewing mirror for the detection of counterfeit documents by the differentiation of watermarks and by detecting the composition of the paper used in the document.

Another advantage of the present invention is that it provides for a compact and smaller UV counterfeit detector that uses a viewing mirror to increase the illumination area created by the 365 nm UV LED light source by doubling the distance between the LED and viewing area without increasing the size of the housing.

Another advantage of the present invention is that it provides for a UV counterfeit detector that uses a dark interior compartment when viewing the currency in order to reduce substantially outside ambient light, and provides for a dual purpose viewing mirror 1) to increase the illumination area of the UV LED light source having a wavelength of 365 nm, and 2) to allow viewing by the user into the dark interior compartment without significantly increasing the entry of ambient light into the dark interior compartment.

Another advantage of the present invention is that it provides for a UV counterfeit detector that uses an LED as the source of visible white light to illuminate embedded watermarks on the back of the currency being examined.

Another advantage of the present invention is that it provides for a UV counterfeit detector device that uses a translucent plastic window that diffuses the source of visible white light in order to prevent the user from looking directly into the white light through the viewing window which provides for easier identification of hidden watermarks in the currency.

Another advantage of the present invention is that it provides for a counterfeit detector that has a printed circuit board (PCB) that mounts a single visible white light LED thereon.

Another advantage of the present invention is that it provides for a UV counterfeit detector that has a PCB having a plurality of resistors for reducing the battery voltage to the UV LED's from 4.5V to approximately 3.6V in order to use a plurality of AAA or AA batteries to power the detector.

Another advantage of the present invention is that it provides for a UV counterfeit detector that includes a three (3) position toggle switch or rocker switch having three (3) operating positions, wherein a first operating position is for producing a source of diffused visible white light for identification of watermarks on currency; a second operating position is for producing a source of UV light directed on the front of currency in order to illuminate UV holographic images and UV activated inks on the currency; and a third operating position is for providing an off-mode position to save battery life.

Another advantage of the present invention is that it provides for a UV counterfeit detector that is lightweight, portable, compact, durable, long-lasting, easy to clean and easy to operate by a user.

A further advantage of the present invention is that it provides for a UV counterfeit detector that can be mass-produced in an automated and economical manner and is readily affordable by the user.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An ultraviolet (UV) detector for detecting and verifying the authenticity of documents placed therein and exposed to ultraviolet light and ambient (white light) backlighting, comprising:

a) a detector housing having a top covering case and a base chassis for forming said detector housing;

b) said detector housing including a viewing chamber having a viewing mirror mounted therein for viewing documents;

c) said detector housing including a document insertion slot for inserting documents into said viewing chamber adjacent to said viewing mirror;

d) said detector housing including an LED holder for holding one or more LED's therein to provide a source of UV light in said viewing chamber which is transmitted to said viewing mirror and to the documents for identifying UV activated features on the documents, including UV holographic images and/or UV activated inks on the documents being illuminated;

e) said viewing chamber for viewing said UV activated features on said viewing mirror by the user;

f) said detector housing including a translucent member disposed therein for diffusing visible white light;

g) means for holding at least one LED to provide a source of visible white light in said housing which is transmitted to said translucent member for diffusing said visible white light for identifying watermarks on the documents being illuminated;

h) said viewing mirror reflects the identified watermarks to said viewing chamber for viewing by the user; and i) the placement of said viewing mirror increases the area illuminated on the documents by said UV light to reduce the size of said detector housing.

2. A UV currency detector in accordance with claim 1, wherein said viewing mirror increases the area illuminated on the documents by said UV light source by four (4) times without increasing the viewing distance of said viewing chamber.

3. A UV currency detector in accordance with claim 1, wherein said means for holding includes a printed circuit board (PCB) mounted in said housing.

4. A UV currency detector in accordance with claim 1, wherein one or more of said UV LED's is a UV light source having a wavelength of 365 nm and a viewing angle between 10° to 40°.

5. A UV currency detector in accordance with claim 1, wherein one or more of said UV LED's is a UV light source having a wavelength of 390 nm and a viewing angle between 30° to 60°.

6. A UV currency detector in accordance with claim 1, wherein said viewing mirror is positioned in said housing at an angle alpha ($\alpha$) with respect to said base chassis, wherein said angle alpha ($\alpha$) is in the range of 27° to 33° with respect to said base chassis.

7. A UV currency detector in accordance with claim 1, wherein said housing includes a three (3) position switch in the form of a toggle switch or a rocker switch having three (3) operating positions.

8. A UV currency detector in accordance with claim 7, wherein said first operating position is for producing a source of diffused visible white light for identification of watermarks on currency; said second operating position is for producing a source of UV light directed on the front of the currency in order to illuminate UV holographic images or UV activated inks on the currency; and said third operating position is for providing an off-mode position to save the battery life of batteries contained therein.

9. A UV currency detector in accordance with claim 3, wherein said PCB includes a plurality of resistors for reducing the voltage of said batteries from 4.5V to approximately 3.6V.

10. A UV currency detector in accordance with claim 1, wherein said translucent member is made from plastic.

11. A UV currency detector in accordance with claim 1, wherein said housing includes a battery compartment having a battery cover thereon; and wherein said battery compartment is for receiving a plurality of batteries therein.

12. A UV currency detector in accordance with claim 1, wherein said housing includes a mirror receiving well for receiving said viewing mirror therein.

13. A UV currency detector in accordance with claim 1, wherein said LED holder includes a housing having a first plurality of spaced-apart LED openings therein, each for receiving an LED for providing a source of UV light; and having a second plurality of spaced-apart LED openings therein, each for receiving an LED for providing a source of UV light.

14. A UV currency detector in accordance with claim 13, wherein said first plurality of LED openings is positioned along a first axis line and said second plurality of LED openings is positioned along a second axis line, and said first and second axis lines are perpendicular to each other.

15. A UV currency detector device in accordance with claim 1, wherein said detector housing includes a plurality of spaced-apart framing brackets for positioning and placement of said covering case with respect to said base chassis.

16. A method for detecting and verifying the authenticity of a document placed in an ultraviolet detector for exposure to ultraviolet light and ambient (white light) backlighting, said detector including a viewing chamber having a viewing mirror mounted therein for viewing the document, comprising the steps of:

a) inserting a document into a document insertion slot in said viewing chamber adjacent to said viewing mirror;

b) transmitting UV light from an LED in said viewing chamber to said viewing mirror and to the document for identifying UV activated features on the document, including UV holographic images and/or UV activated inks on the document being illuminated;

c) viewing said UV activated features on said viewing mirror in said viewing chamber to determine the authenticity of the document;

d) transmitting visible white light from an LED in said detector to a translucent member for diffusing said visible white light for identifying watermarks on the document being illuminated in said viewing chamber;

e) viewing the illuminated watermarks on said viewing mirror to determine the authenticity of the document; and f) placing said viewing mirror in said housing to increase the area illuminated on the documents by said UV light to reduce the size of said detector.

17. A method for detecting and verifying the authenticity of a document placed in an ultraviolet detector in accordance with claim 16, wherein the steps of transmitting includes:

a) producing a source of diffused visible white light for identification of watermarks on currency;

b) producing a source of UV light directed at the currency in order to illuminate UV holographic images or UV activated inks on the currency; and c) providing an off-mode position in order to save battery life.

* * * * *